UNITED STATES PATENT OFFICE 1,932,248

PERMANENT QUICK DRYING WRITING FLUID

Carl S. Miner, Chicago, Ill., and Galen H. Sayler, Janesville, Wis., assignors to The Parker Pen Company, Janesville, Wis., a corporation of Wisconsin No Drawing. Application February 24, 1931
Serial No. 518,024

4 Claims. (Cl. 134—37)

The object of this invention is to produce a permanent, non-feathering, water-proof, quick-drying ink of satisfactory flow quality for fountain pens.

It has been known that inks produced by dissolving certain alkali resistant dyes in alkaline solutions such for example as those containing caustic soda have certain desirable qualities such as fastness to water and light and resistance to chemicals such as are used in commercial ink eradicators. If sufficiently strong alkaline solutions are used, the ink is remarkably quick-drying. The quick-drying effect is produced by the penetrating powers of the alkali which causes the ink to sink rapidly into the paper. However, such ink is unsatisfactory for commercial use because it "bleeds" or seeps from fountain pens when they are held in a horizontal position or with the pen pointed downward as in writing, or in fountain pen desk sets, and also because the flow of such ink is much too free from ordinary fountain pens. In addition such inks tend to feather badly and are undesirable because of that fact. Furthermore, such alkaline inks containing dyestuffs as their essential coloring constituents are not fast to light nor permanent. Permanence may be defined as the keeping qualities of the ink after it has been applied to the paper. Writing made with such ink will fade on prolonged exposure to sunlight or even after paper containing the writing is stored for many years. The inks are in no wise permanent as are the iron tannate or so-called carbon inks. We have discovered that these characteristic faults can be improved without the loss of the highly desirable quick-drying qualities of such inks.

When the viscosity and surface tension of these inks are measured in comparison with those of ordinary market inks, no differences are found which adequately explain their undesirable characteristics of bleeding and excessively free flow. We have discovered that these characteristics are controlled in a large part by the ability of such inks to wet surfaces such as the gold of the pen nibs. The angle of wetting formed by a drop of water in contact with a gold pen is approximately 30°. When alkali in quantity sufficient to produce a quick-drying ink is added to water or to water solutions of dye such as can be used to produce such inks, the angle of wetting between the ink and the gold pen nib becomes zero, or in other words no drop is formed when a small portion of ink is placed on a surface consisting of gold alloy of the composition used in the pen, but instead the ink spreads out in an extremely thin film over the gold surface. It is this property of perfect wetting which causes the ink to exhibit the characteristics referred to earlier of bleeding and excessive free flow, when used in fountain pens.

One phase of our invention consists in improving these undesirable characteristics of the alkali-dye, quick-drying ink by adding to it chemical compounds capable of increasing the angle of wetting between the ink and the gold pen. The compounds which we have found most effective for this purpose are those which are used for flotation of minerals and of these we have found the xanthates highly satisfactory for our purpose. As little as .02% of amyl xanthate will increase the angle of wetting of a typical quick-drying, alkali-dye ink from 0° to 34° and will wholly prevent the undesirable bleeding.

According to the usually accepted theory of the action of these "promoters" in flotation practice, a film of insoluble xanthate or other promoter is formed on the surface of the mineral particle to be floated which decreases its wettability by water. (See "The Trend of Flotation", Weinig and Palmer, Quar. of the Colorado School of Mines, vol. XXIV, #4, Oct. 1929, p. 21). This is probably the explanation of the action of these reagents in our alkaline ink, a coating is formed on the gold nib which decreases its wettability by the alkaline solution, and ink seepage and flow are reduced.

Other flotation agents belonging to that class of flotation agents known in the art as collecting agents or "chemical promoters" of which amyl xanthate is a member usually but not necessarily characterized by having either carbon double bond sulphur or triple bond nitrogen groups such as for example thiocarbanilid, azobenzene, diazoamino-benzene, p-thiocresol, phenyl-thiourea, phenyl isothiocyanate, butyl xanthate, and sodium xanthate will also substantially improve the flow properties of the ink and will not adversely effect its quick-drying property, its permanence, its water resistance, or its stability. Stability refers to the keeping quality of the liquid ink in the bottle.

The ink will, however, tend to feather and a further phase of our invention involves the addition of a colloidal body such as corn starch which even when as little as .5% is present will overcome the feathering on practically all types of paper. Other colloidal substances such as gums, casein and the like may be used to prevent feathering but starch is particularly desirable because of the type of colloidal solution which it forms in the presence of alkali such as sodium or potassium hydroxide. The flow of the ink may be further improved by the addition of colloidal clays such as the bentonites. We prefer for our inks to use a special highly colloidal bentonite known to the trade as "Wilkinite". This clay when used in amounts as small as .2 of 1% seems to have some favorable effect on the flow of the ink from certain types of fountain pens.

A further phase of our invention is the improvement of the permanence of the alkali-dye inks. We have discovered that these inks can be made much more permanent and resistant to light if certain soluble metallic salts not precipitated by alkali are added to the ink, which produce colored oxides or decomposition products after exposure to light. For example, if we include in our ink .35% of ammonium meta-vanadate, the permanence is increased very greatly since as the dye fades under the action of light, the vanadate decomposes producing a brown residue which makes the writing legible even when the writing has been exposed to light so long that the dye is completely faded away. In addition to vanadates, other soluble metallic salts producing colored residues may be used such as potassium ferro- and ferri-cyanides providing they have no deleterious effects upon the ink. The permanance produced by these metallic salts is comparable with that produced in iron tannate inks by the iron salts since when the color of writing made with iron tannate ink, produced either by dyestuff or tannate, has completely faded away, the residue of iron oxides remains on the paper.

In case the writing containing these metallic salts has so completely faded that only a faint color of metal oxides remain on the paper, the writing can be restored to a more legible form in known ways. For example by chemical treatment with hydrogen sulphide or tannic acid to produce a more deeply colored writing.

The amount of metallic salt to be used may be varied within wide proportions depending upon the degree of fastness required and the composition of the ink. For example, in order to meet the specifications for Government standard writing ink with respect to the minimum content of metallic iron (see Circular Bureau of Standards #95, (1925) "Inks, Typewriter Ribbons and Carbon Paper", page 6), we may use 22.7 grams of potassium ferro-cyanide per liter of ink which is equivalent to the minimum requirement of 3.0 grams of metallic iron or 15 grams of ferro-sulphate per liter. In the case of ammonium meta-vanadate, we find from 3.5 to 7 grams per liter produces satisfactory results.

A satisfactory permanent, water resistant, quick-drying ink may be made according to our invention by the use of a wide range of ingredients and a considerable range of proportions. Many suitable dyes are available. They must not change color in alkaline solutions nor precipitate when stored for long periods and must have a maximum resistance to light and atmospheric conditions. Alkalis of various sorts may be used but sodium hydroxide is cheap and satisfactory. Potassium hydroxide is also efficient but is more expensive than the sodium compound. The concentration of the dye and the alkali may vary over a considerable range depending on the depth of color and the rate of drying desired. A wide range of reagents may be used to produce the anti-wetting effect but flotation reagents of the type of amyl xanthate are highly satisfactory. Many kinds of alkali soluble salts may be used to produce a permanent, quick-drying ink but ammonium vanadate is preferred by us. A specific formula for our quick-drying ink is as follows:

|  | Parts |
|---|---|
| Direct pure blue 6B Ex. Con. (Color Index #518, Schultz #424) | 1.6 |
| Flake caustic soda | 1.8 |
| Ammonium meta-vanadate | 0.35 |
| Amyl xanthate | 0.02 |
| Corn starch | 0.05 |
| Bentonite (Wilkinite) | 0.20 |
| Water | 100.0 |

An ink made in accordance with the above formula will dry on the average in about one-half the time required for ordinary market inks to dry but this ratio will vary somewhat for different types of paper. The sodium hydroxide content of the finished ink may be increased without materially changing the drying rate but if it is decreased below 1% the drying rate will be decreased considerably, and when the percentage of sodium hydroxide is below .1%, the drying rate is not appreciably effected by its presence.

Having described our invention, what we desire to claim and secure by Letters Patent is:

1. A writing fluid comprising in solution a direct dye, flake caustic soda, ammonium meta-vanadate, amyl xanthate, corn starch, Bentonite (Wilkinite) and water.

2. An alkali-dye, quick-drying ink containing amyl xanthate.

3. An alkali-dye, quick-drying ink containing a flotation agent selected from the group which consists of amyl xanthate, thiocarbanilid, azobenzene, diazo-aminobenzene, p-thiocresol, phenyl-thiourea, phenyl isothiocyanate, butyl xanthate, and sodium xanthate.

4. An alkali-dye, quick-drying ink containing a colloidal body and a flotation agent selected from the group which consists of amyl xanthate, thiocarbanilid, azobenzene, diazo-amino-benzene, p-thiocresol, phenyl-thiourea, phenyl isothiocyanate, butyl xanthate, and sodium xanthate.

CARL S. MINER.
GALEN H. SAYLER.